June 13, 1950
L. A. MAYBERRY
2,511,409
SUPERREGENERATIVE CIRCUIT
Filed Oct. 22, 1947
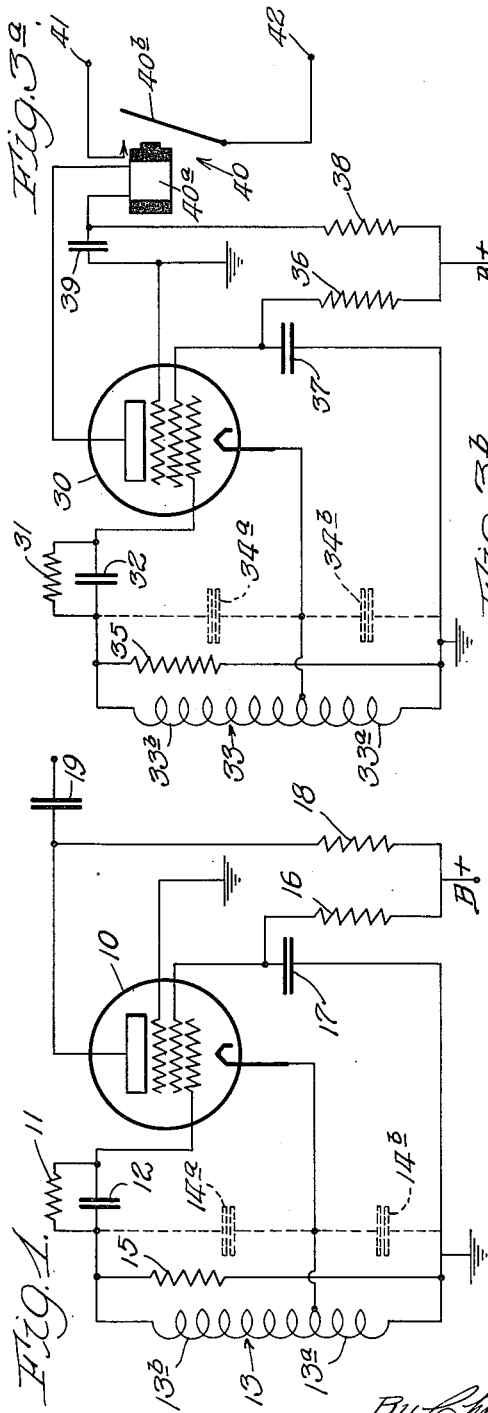
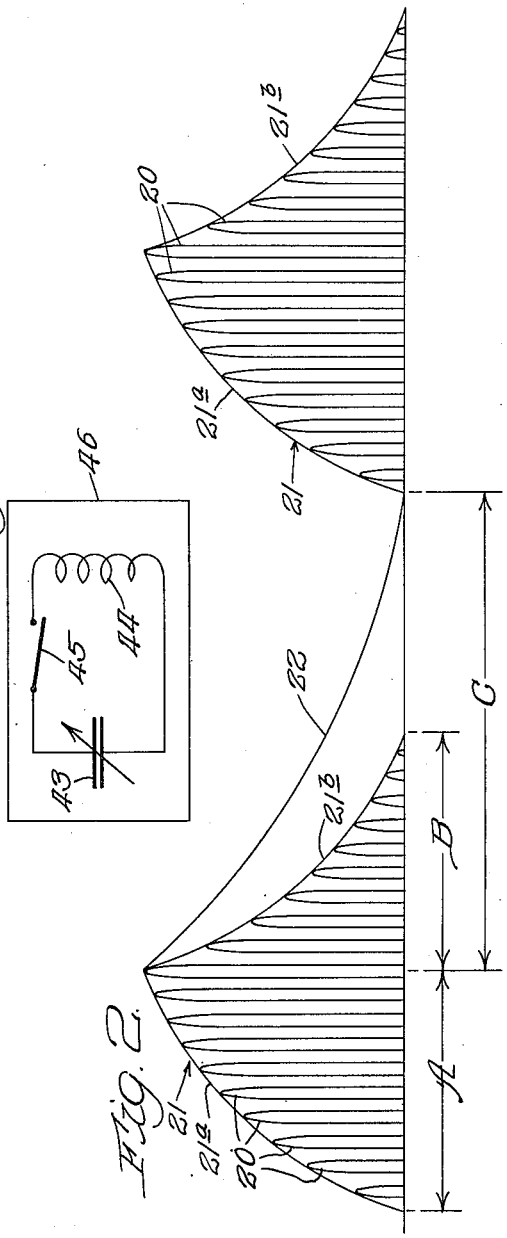
Inventor:
Leonard A. Mayberry Patented June 13, 1950

2,511,409

UNITED STATES PATENT OFFICE 2,511,409

SUPERREGENERATIVE CIRCUIT

Leonard A. Mayberry, Wheaton, Ill., assignor to The Hallicrafters Co., a corporation of Illinois Application October 22, 1947, Serial No. 781,339

11 Claims. (Cl. 250—36)

This invention relates to electronic apparatus and more particularly to a superregenerative actuating circuit having a tuned remote-control circuit associated therewith.

While the basic principles of superregeneration have been known for many years, superregenerative circuits have never been used, to the best of my knowledge, in the manner of a switch to actuate auxiliary equipment by remote control.

In certain applications it is desirable to provide a remote control arrangement whereby certain equipment be actuated, as for example by means of a current responsive switch. In the past it has been found necessary to utilize a control device which is connected by a wire or other means to the apparatus to be controlled, or if the control arrangement was completely separated and located remote from the apparatus to be controlled, it has been found necessary to provide the control arrangement with its own power supply, either by means of batteries or by a line cord adapted to be connected to a source of current and so connected as to actuate tubes or other apparatus carried by the control device.

I have devised and am here disclosing and claiming electronic apparatus comprising a superregenerative stage which acts as an actuating circuit for a current responsive device, and a control circuit which may be and preferably is remotely located from the superregenerative stage. Furthermore, my control circuit comprises a very simple tuned circuit and is not connected to the superregenerative stage or to any external source of power, and in addition, the control circuit does not carry any batteries, electronic tubes or other power supply apparatus. The basic principle of operation of my apparatus results from the fact that I provide a tuned control circuit having a higher Q, and consequently a longer oscillatory decay time than does the oscillatory circuit which forms part of the superregenerative stage.

A feature of this invention is that it provides a superregenerative actuating circuit which may be controlled by a very simple separate control device. Another feature of this invention is that the control device comprises a tuned circuit having a higher Q than certain circuits of the superregenerative stage. Furthermore, as another feature of this invention, the control circuit is not physically connected in any manner to the superregenerative actuating circuit, and may be located remotely therefrom.

A further feature of this invention is that the control circuit comprises only a tuned circuit together with selectively operable means for bringing the control circuit into and out of resonance with the superregenerative circuit, said control circuit requiring no external source of power and being small, light and very readily portable.

Other features and advantages of my invention will be apparent from the following specification and from the drawings, in which:

Fig. 1 is a schematic diagram of a basic superregenerative circuit designed and constructed in accordance with my invention;

Fig. 2 is a graph illustrating certain features of the operation of the circuit of Fig. 1;

Fig. 3, comprising the portions 3a and 3b, is a schematic diagram of an operable arrangement including a superregenerative circuit constructed in accordance with my invention and adapted to be utilized as an actuating device for auxiliary apparatus together with a control circuit therefor, Fig. 3a illustrating a superregenerative actuating circuit and Fig. 3b illustrating a remotely located control circuit.

I have heretofore devised and have disclosed in my copending application for "Radio apparatus," filed October 22, 1947, as Serial No. 781,338, a superregenerative circuit wherein a tuned circuit associated with the amplifying tube has an abnormally low ratio of reactance to resistance and an abnormally low Q. This novel superregenerative circuit results in several advantages which are disclosed and claimed in the above mentioned application. In addition, said circuit is particularly adapted for use as the actuating portion of my present invention, and as such actuating portion may be readily utilized to actuate various types of auxiliary equipment, as for example a stepping relay, a tuning motor, etc., or may be utilized as a communications link.

While my present invention may comprise various types of superregenerative circuits having associated therewith a control circuit with electrical characteristics such that the control circuit has a longer oscillatory decay time than does the tuned circuit of the superregenerative stage, for practical reasons I prefer to construct the superregenerative actuating circuit of my present invention in accordance with the principles set forth in the above mentioned application. Since, as pointed out earlier, it is necessary that the tuned circuit of the superregenerative actuating stage have a lower Q than the tuned control circuit, as a practical matter it is preferable to utilize a tuned control circuit having a normal relatively high Q and to lower the Q of the superregenerative actuating stage to an abnormally low value in accordance with the invention disclosed in the above mentioned application than it would be to utilize a normally high Q for the tuned circuit in the superregenerative stage and then to construct a tuned control circuit having a Q much higher than normal.

Referring now to the drawings, Figs. 1 and 2 will be used to illustrate the construction and operation of a low Q superregenerative circuit.

In such circuit a tube 10, which may be of tube type No. 6AU6 having cathode, control grid, screen grid, suppressor grid and anode elements, is used as an intermittent oscillator. The control grid of said tube is connected to a tuned input circuit through a resistive-capacitive arrangement comprising a resistor 11 (which may have a value of 56,000 ohms) and a condenser 12 (which may have a value of 50 micro-microfarads), the condenser and resistor being connected in parallel between the control grid and said input circuit, and thus back to the cathode, to which the tuned input circuit is connected. The input circuit comprises a parallel combination of an inductance designated generally at 13, and a resistor 15. The inductance may have a value suitable to resonate with the distributed circuit capacitance designated at 14a and 14b at a desired frequency, as for example 5.25 megacycles, and the resistive circuit component or element 15 which is connected in parallel with the tuned circuit may have a value of 8,000 ohms. This resistor, here shown as connected across the tuned circuit, provides the same damping effect as would a much small resistance connected in series in said circuit, reducing the ratio of reactance to resistance, or the "Q" of the circuit.

An output circuit is also associated with the tube 10, this circuit being the screen grid-cathode circuit. Feed-back coupling between the output and input circuits, sufficient to develop oscillation, is provided by means of inductive coupling between the screen grid-cathode portion 13a and the control grid-cathode portion 13b of the inductance 13. The degree of coupling between the two portions of the inductance together with their inductance ratio determines what portion of the oscillatory energy in the output circuit of the tube is coupled back into the input circuit of the tube to provide the desired regenerative action. In one circuit which I have constructed, the inductance 13 comprises 144 turns of #38 S. C. E. wire tapped at 40 turns from the ground end. The screen grid acts as the oscillator anode in the tube 10, and said screen grid is connected to B-plus through a resistor 16 which may have a value of 75,000 ohms and which isolates the B-plus supply from the oscillatory energy in the output circuit, this energy being coupled to the grounded side of the inductance 13 through a condenser 17 which may, for example, have a value of 0.005 microfarad. The cathode of the tube 10 is returned to ground and to the negative side of the B-plus supply through the lower portion 13a of the inductance 13, and the plate anode of the tube 10, which is coupled to the oscillator portion of the tube by the electron stream within the tube, is connected to B-plus through a resistor 18, which may have a value of 68,000 ohms. A coupling condenser 19, which may have a value of 50 micro-microfarads, is in a lead from the plate of the tube to an output terminal.

In a circuit of this type each oscillation cycle must be started by some voltage having a frequency component within the regenerative pass band of the tuned input circuit, and if no such voltage were present the tube 10 would never start to oscillate; however, such a voltage is always found in a circuit of this type since there are always minute random fluctuations of electrons known as thermal agitation or noise voltage, some frequency component of which always lies with the regenerative band of the tuned input circuit. The amplitude of these thermal voltages is of the order of one microvolt in most practical tuned circuits.

The oscillations, once started as these thermal voltages are coupled into the input circuit, rapidly build up to a maximum value due to the regenerative or feed-back action of the circuit. The amplitude of this maximum value depends on the relationship between the negative bias voltage developed at the grid of the tube by rectification of grid-cathode current, the mutual conductance of the tube, plate and screen resistance, and D. C. voltages.

The maximum amplitude of these oscillations may be of the order of one volt or more in a low power oscillator. In this event the ratio of the maximum voltage to a starting or actuating voltage of the order of one microvolt (whether a thermal or signal voltage) is approximately one million to one, thus providing an extremely high amplification factor for a single stage. A portion of the output is constantly being fed back into the input circuit because of the coupling between the two portions 13a and 13b of the inductance 13, and this regenerative action would normally cause the tube 10 to continue oscillating. However, it is possible to provide such values for the resistor 11 and the condenser 12 that the negative grid bias voltage developed by the grid-cathode rectification in the tube charges the condenser 12 to a value high enough to cut off the flow of plate current through the tube. If the time constant of the resistor 11 and the condenser 12 is sufficiently long to hold the tube below cutoff for the duration of the next cycle of oscillatory voltage across the tuned input circuit, the oscillations will gradually decay at a rate determined by the ratio of reactance to resistance in said input circuit. When the condenser 12 has discharged through the resistor 11 to a degree where is voltage is such that the tube 10 is no longer cut off, plate current will again flow through the tube and minute voltage fluctuations will again be coupled into the input circuit to start a new cycle of oscillations. The rate at which these oscillatory cycles occur is known as the "quench" frequency, and the principle of cyclically applying a quench frequency to a regenerative oscillator is known as superregeneration. Obviously, other ways of cyclically quenching oscillation may be utilized if desired, as for example by utilizing a separate oscillator which applies a voltage to the tube 10 sufficient to cut off said tube intermittently at a predetermined rate.

If, instead of allowing thermal noise voltages to trigger the tube to initiate each cycle, we introduce a control voltage of greater amplitude than the thermal noise level, this control voltage may advance the start of each cycle. This action results in effectively changing the quench frequency with consequent changes in average anode current drawn by the tube.

I have found that in a conventionally designed input circuit, normally of relatively high Q, tuned to operate in a desired range no higher than about 5.25 megacycles, 15 kc. is about the highest quench frequency possible. With such a circuit the ratio of the length of each buildup-decay cycle to the time between such cycles is about 1 to 16. If the quench frequency is raised to 50 kc., this ratio is about 1 to 6, and the result is that the circuit oscillates continuously and no longer acts as a superregenerative oscillator. I have discovered that this continued oscillation is caused by the long oscillatory decay time of the tuned input circuit, the oscillations in such circuit failing to decay to a level lower than the thermal noise level before the start of the next buildup-decay cycle. In this specification and the claims attached hereto, it will be understood that "decay time" means the length of time required for the amplitude of the high frequency oscillations to be reduced from the maximum value to a value at or below the thermal agitation noise level.

Fig. 2 shows the action of the superregenerative circuit in Fig. 1, when said circuit is designed in accordance with my invention, the axis of ordinates in said figure representing voltage amplitude and the axis of abscissas in said figure representing time. In Fig. 2 the high frequency oscillations (5.25 megacycles in the example given) of the circuit are schematically illustrated at 20, while the buildup-decay cycles of the circuit are designated generally at 21. The rising portion 21a of each of these cycles represents the buildup of the oscillations to a maximum value, and the decaying portion 21b of said cycles represents the oscillatory decay time of the input circuit. The decay curve of the resistive-capacitive grid leak circuit 11—12 is designated at 22.

From this figure it will be seen that in my improved superregenerative circuit the oscillatory buildup time A is approximately equal to the oscillatory decay time B of the tuned input circuit, and the decay time C of the RC grid leak network is of the order of twice the time B. Explaining the graph in another way, the circuit builds up to maximum output in the time A and decays to minimum output in the time B, A and B being substantially equal to each other. The bias voltage on the grid of the tube 10 reaches a value sufficient to cut the tube off at the peak of the cycle 21, and said bias voltage gradually decays during the time C to a point where the tube is allowed to conduct again. In Fig. 2 the cyclical quench rate is defined by time A plus time C and each quench period is at least as long and preferably of the order of twice each oscillatory period. The decay for the tuned input circuit follows the formula $$\frac{E_2}{E_1} = \frac{1}{\epsilon^{at}}$$

where $E_1$ and $E_2$ are respectively the initial and final voltages, $\epsilon$ is the base of the system of natural logarithms (a constant equal to 2.718+), $a$ equals $$\frac{R}{2L}$$

($R$ being equal to the equivalent series resistance of the circuit in ohms, and $L$ being equal to the inductance of the circuit in henrys), and $t$ equals the elapsed time in seconds. Since $$Q = \frac{\omega L}{R}$$

($Q$ being equal to the ratio of reactance to resistance and $\omega$ being equal to $2\pi$ times the frequency in cycles per second), the formula may be expressed as $$\frac{E_2}{E_1} = \frac{1}{\epsilon^{\frac{\omega t}{2Q}}}$$

If the total time is equal to one cycle of the radio frequency voltage, $\omega t$ may be replaced by $2\pi$, which simplifies the expression to $$\frac{E_2}{E_1} = \frac{1}{\epsilon^{\frac{\pi}{Q}}}$$

Substituting $\alpha_1$ for $$\frac{E_2}{E_1}$$

and rearranging, $$Q = \frac{-1.36}{\log_{10} \alpha_1}$$

If $\alpha_1$ is expressed in decibels, then $$\log \alpha_1 = \frac{-d}{20}$$

and the formula for Q becomes $$Q = \frac{27}{\alpha}$$

where $\alpha$ is equal to the attenuation per cycle in decibels.

By examination of this formula for Q, it may be seen that higher values of Q lead to smaller values of attenuation per cycle, and conversely lower values of Q lead to larger values of attenuation per cycle.

From the above it will be seen that in a superregenerative circuit designed to have the operating characteristics as shown in Fig. 2, the input circuit associated with the control grid of the superregenerative tube must have an abnormally low ratio of reactance to resistance (Q) and consequently a short oscillatory decay time. In such circuit the time for oscillations to build up to a peak (time A in Fig. 2) plus the time it takes for oscillations in the input circuit to decay to a level below the thermal or noise voltage (time B in Fig. 2) should be as short as possible compared to the peak amplitude of the oscillatory voltage, and the time it takes the quench or grid bias voltage to decay to a point where the tube may again conduct (the quenched period or time C in Fig. 2) should be at least as long as the decay time of the input circuit. I prefer that the quenched period or time C be of the order of twice time B in order to assure complete cessation of oscillations while tube 10 is cut off.

The desired abnormally low Q of the tuned input circuit may be mathematically calculated to correspond to this requirement by making use of the formula derived above.

For example, if the operating frequency is 5.25 megacycles and the desired quench frequency is 100 kc., the peak amplitude equals 1 volt, and the thermal level or noise voltage is assumed to be 1 microvolt, the ratio of oscillatory cycles to quench cycles is 52.5 to 1. Expressed in terms of the graph in Fig. 2, time A plus time C equals 52.5 oscillatory cycles, and the oscillatory voltage must decay from its maximum of 1 volt to 1 microvolt, a total attenuation of 120 db., in time B or in approximately 17 oscillatory cycles. Consequently, the rate of attenuation in the input circuit must be approximately 7 db. per cycle. Applying the formula for Q noted above Q equals $$\frac{27}{7}$$

or approximately 4, which is abnormally low for such a circuit.

The choice of values for the resistor 11 and the condenser 12 to provide an operating curve substantially as shown in Fig. 2 may also be mathematically determined since the decay of an RC circuit follows the curve expressed by the formula $$\frac{1}{\epsilon \frac{RC}{t}}$$

Since $t$ is known, it being a function of the desired quench frequency, and since the maximum grid bias at the time the tube is quenched is known and since the grid bias value when the tube is ready to conduct is also known, the total RC value can be determined. By arbitrarily picking an appropriate value for either the condenser or the resistor, the value of the unknown element may readily be determined. The calculations above result in a superregenerative circuit constructed as shown schematically in Fig. 1 and having operating characteristics as shown diagrammatically in Fig. 2, wherein a 5.25 megacycle operating frequency and a 100 kc. quench frequency are used, representing an increase of about 16 times in the theoretical top limit for the quench frequency according to formerly known design principles.

Fig. 3a shows a superregenerative circuit basically similar to the circuit of Fig. 1, but modified to include a current actuated switch in its output, and Fig. 3b shows a remotely located circuit adapted to control the operation of the superregenerative circuit of Fig. 3a. Since the circuit of Fig. 3a is basically similar to the circuit of Fig. 1, reference characters will be used which are 20 higher than those used to describe the operation of the circuit of Fig. 1.

In Fig. 3a a tube 30, which may be of tube type No. 6AU6 having cathode, grid and anode elements, is adapted to act as a superregenerative oscillator. The control grid of the tube is connected through an RC network comprising a resistor 31 and a condenser 32 in parallel to a tuned input circuit having resistive, inductive and capacitive components. This tuned circuit comprises a parallel combination of an inductance designated generally at 33 and having a control grid-cathode portion 33b and a screen grid-cathode portion 33a. A resistor 35 is connected across the inductance 33, this resistor providing the same damping effect as would a much smaller resistance connected in series in a circuit, and reducing the ratio of reactance to resistance or the Q of the circuit. The inductance 33 has a value suitable to resonate with the distributive circuit capacitance designated at 34a and 34b as in the circuit illustrated in Fig. 1.

As in the earlier described circuit, the screen grid acts as the oscillator anode, this grid being connected to the B-plus supply through a resistor 36 and the high frequency output component in the circuit being by-passed around the B-plus supply by means of a condenser 37 which is connected between the oscillator anode and ground.

The plate of the tube acts as another anode, being coupled to the oscillator section of the tube by the electron stream in the tube so that when the tube is oscillating there is a flow of plate current to this portion of the tube output. The plate or second anode is connected to the B-plus supply through a resistor 38, a condenser 39 being connected from the plate side of the resistor 38 to ground in order to by-pass the high frequency component of this portion of the output around the B-plus supply.

An actuating device operable as a function of the flow of current in this last described portion of the tube output comprises a relay 40 having an actuating coil 40a and a normally open armature switch 40b, this switch being connected across output terminals 41 and 42.

The coil 40a is connected in series with the plate of the tube 30 and the B-plus supply so that the plate current of the tube flows through said relay. The values of the electrical components of the superregenerative circuit of Fig. 3a may be such that said circuit has operating characteristics similar to those illustrated in Fig. 2, the relatively low ratio of reactance to resistance in the input circuit providing a short oscillatory decay time as indicated at 21b of Fig. 2, and the time constant of the grid leak network 31—32 operating to hold the tube 30 below cutoff for at least as long as said decay time and preferably of the order of twice as long as said decay time. The value of the plate voltage applied to the tube 30 and the operating characteristics of the relay 40 are so arranged that during the normal superregenerative operation of the tube and its associated circuits the average plate current, or the average of that portion of the output of the tube which flows through the second anode circuit and through the relay coil 40a is insufficient to actuate the relay 40 so that the switch 40b remains open.

However, if as mentioned earlier a control voltage is applied to the superregenerative circuit the start of each buildup-decay cycle may be varied to increase the average output current through the tube.

Fig. 3b illustrates a control circuit which may be and preferably is located remote from the superregenerative circuit above described and not physically connected to said superregenerative circuit. This control circuit comprises a tuned circuit including a condenser 43, an inductance 44 and a switch 45. The inductive and capacitive components of this circuit are such that it is resonant at or near the operating frequency of the superregenerative circuit of Fig. 3a, and the control circuit is so designed that its ratio of reactance to resistance, or Q, is of a normal value. Since the normal Q of such a circuit is high compared to the Q of the input circuit of Fig. 3a, which is preferably of the order of only 4, the control circuit has a relatively long oscillatory decay time when compared to the decay time of the input circuit to the superregenerative stage.

In operation, during each oscillatory period of the superregenerative circuit of Fig. 3a, oscillatory energy is radiated from the input circuit and is coupled into or picked up by the control circuit of Fig. 3b, assuming of course that the switch 45 is closed. During the quench or non-oscillating portion of the superregenerative cycle energy is radiated from the control circuit back to the input circuit of the superregenerative stage. This action occurs because oscillations in the tuned control circuit do not decay as rapidly as do oscillations in the input circuit of the superregenerative stage. This re-radiated energy which is coupled back to the superregenerative circuit acts to overcome the decaying grid voltage (22 of Fig. 2) so that the next oscillatory cycle starts sooner than it otherwise would. This causes the tube 30 to oscillate a greater percentage of the total time and consequently the average anode current drawn by the tube 30 is increased, and the relay coil 40a is energized sufficiently to actuate the switch 40b. The output terminals 41 and 42 may be connected to a plate current relay, a D. C. amplifier which may be used to control a stepping relay, a tuning motor, or to any other desired apparatus. This arrangement may also have application as a communications link, for if the control circuit is modulated by voice or other waves, the superregenerative circuit of Fig. 3a will also be modulated.

It will be seen that the control circuit is not connected to the superregenerative stage, utilizes no batteries or any other source of power, and that this circuit is very simple in construction and light in weight and may readily be moved from place to place. If desired, the control may be housed in a box or other compartment 46, this housing being of non-shielding material.

While the means for selectively bringing the control circuit into and out of resonance with the oscillatory energy of the superregenerative stage is illustrated as being a switch 45, it will be obvious that this on-off or resonant-unresonant condition may be obtained by other means, as for example by tuning the condenser 43 or the inductance 44, in which case the switch 45 may be eliminated entirely.

By designing the superregenerative circuit in such a manner that it has an abnormally low Q, as for example a Q of the order of 4 while designing the control circuit with the normally high or conventional Q, a very substantial change in average plate current through the tube 30 may be obtained so that the action of the relay 40 is positive, the switch associated with said relay being immediately actuated upon closure of the switch 45 in the control circuit, and the switch 40b associated with the relay being immediately actuated in the reverse direction upon opening the switch 45 or in some other manner throwing the control circuit out of resonance with the oscillatory energy developed by the superregenerative circuit.

Of course, if desired, a superregenerative stage may be constructed having an oscillatory circuit of normally high Q. In this event the control circuit should have a Q considerably higher than normal in order to provide the desired difference in oscillatory decay time.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described, including: an amplifier tube; an input circuit associated with said tube; an output circuit associated with said tube; coupling between said circuits for causing said tube to oscillate at a predetermined frequency; circuit connections for quenching said oscillations cyclically for a certain period; a tuned control circuit having a decay time longer than one quenched period of said tube; and selectively operable means for bringing said control circuit into and out of resonance with said oscillations, said control circuit being adapted, when in resonance with said input circuit, to receive oscillatory energy from said input circuit during each oscillatory period of said tube, and to transmit energy to said input circuit during each quenched period for controlling the start of the next oscillatory period.

2. Apparatus of the character described, including: an amplifier tube; an input circuit associated with said tube; an output circuit associated with said tube, at least one of said circuits being tuned and having a certain oscillatory decay time; coupling between said circuits for causing said tube to oscillate at the resonant frequency of said tuned circuit; circuit connections for quenching said oscillations periodically; a tuned control circuit having a relatively high ratio of reactance to resistance and having a longer decay time than that of the tuned circuit associated with said tube; and selectively operable means for bringing said control circuit into and out of resonance with said oscillations, said control circuit being adapted, when in resonance with said input circuit, to receive oscillatory energy from said input circuit during each oscillatory period of said tube, and to transmit energy to said input circuit during each period when said oscillations are quenched for controlling the start of the next oscillatory period.

3. Apparatus of the character described, including: an amplifier tube; an input circuit associated with said tube; an output circuit associated with said tube, at least one of said circuits being tuned and having resistive and reactive components so proportioned that at resonance the ratio of reactance to resistance is abnormally low; coupling between said circuits for causing said tube to oscillate at the resonant frequency of said tuned circuit; circuit connections for quenching such oscillations cyclically for a certain period; a tuned control circuit having a decay time longer than one quenched period of said tube; and selectively operable means for bringing said control circuit into and out of resonance with said oscillations, said control circuit being adapted, when in resonance with said input circuit, to receive oscillatory energy from said input circuit during each oscillatory period of said tube, and to transmit energy to said input circuit during each quenched period for controlling the start of the next oscillatory period.

4. Apparatus of the character described, including: an amplifier tube; an input circuit associated with said tube; an output circuit associated with said tube, at least one of said circuits being tuned and having a Q of the order of 4; coupling between said circuits for causing said tube to oscillate at the resonant frequency of said tuned circuit; circuit connections for quenching such oscillations cyclically for a certain period; a tuned control circuit having a decay time longer than one quenched period of said tube; and selectively operable means for bringing said control circuit into and out of resonance with said oscillations, said control circuit being adapted, when in resonance with said input circuit, to receive oscillatory energy from said input circuit during each oscillatory period of said tube, and to transmit energy to said input circuit during each quenched period for controlling the start of the next oscillatory period.

5. Apparatus of the character described, including: an amplifier tube; a tuned input circuit associated with said tube, said circuit having a low ratio of reactance to resistance and having a short oscillatory decay time; an output circuit associated with said tube; coupling between said circuits for causing said tube to oscillate; circuit connections for applying cyclically a gradually decaying voltage to said tube to quench said oscillations for a certain period; a tuned control circuit having a relatively high ratio of reactance to resistance and having a decay time at least in the order of one quenched period of said tube; and selectively operable means for bringing said control circuit into and out of resonance with said input circuit, said control circuit being adapted, when in resonance with said input circuit, to receive oscillatory energy from said input circuit during each oscillatory period of said tube, and to transmit energy to said input circuit during each quenched period for controlling the start of the next oscillatory period.

6. Apparatus of the character claimed in claim 5, wherein each of said quenched periods is at least as long as the decay time of said input circuit.

7. Apparatus of the character claimed in claim 5 wherein each of said quenched periods is in the order of twice as long as the decay time of said input circuit and said control circuit is located remote from said tube and its associated circuits.

8. Apparatus of the character described, including: an amplifier tube; an input circuit associated with said tube; an output circuit associated with said tube; coupling between said circuits for causing said tube to oscillate at a predetermined frequency; circuit connections for quenching said oscillations cyclically for a certain period; a remotely located tuned control circuit having a relatively high ratio of reactance to resistance and having a decay time at least in the order of one quenched period of said tube; a switch associated with said control circuit for selectively bringing said control circuit into and out of resonance with said input circuit, said control circuit being adapted, when in resonance with said input circuit, to receive oscillatory energy from said input circuit during each oscillatory period of said tube and to transmit oscillatory energy to said input circuit during each quenched period for advancing the start of the next oscillatory period; and an actuating device operable as a function of the flow of current in said output circuit.

9. Apparatus of the character described, including: an amplifier tube; a tuned input circuit associated with said tube, said circuit having a low ratio of reactance to resistance and having a short oscillatory decay time; an output circuit associated with said tube; coupling between said circuits for causing said tube to oscillate; circuit connections for applying cyclically a gradually decaying voltage to said tube to quench said oscillations for a certain period; a remotely located tuned control circuit having a relatively high ratio of reactance to resistance and having a decay time at least in the order of the decay time of said quenching voltage; a switch associated with said control circuit for selectively bringing said control circuit into and out of resonance with said input circuit, said control circuit being adapted, when in resonance with said input circuit, to receive oscillatory energy from said input circuit during each oscillatory period of said tube and to transmit oscilatory energy to said input circuit during each quenched period for advancing the start of the next oscillatory period; and an actuating device operable as a function of the flow of current in said output circuit.

10. Apparatus of the character described, including: an amplifier tube having cathode, grid and anode elements; a tuned input circuit connected to the grid of said tube, said circuit having resistive, inductive and capacitive components so proportioned that at resonance the ratio of the reactance to the resistance is low and said circuit has a relatively short oscillatory decay time; an output circuit connected to an anode of said tube; coupling between said circuits for causing said tube to oscillate at the resonant frequency of said input circuit; circuit connections for applying cyclically a gradually decaying voltage to said tube to quench said oscillations, said voltage preventing said tube from oscillating for a period at least of the order of twice said oscillatory decay time; a remotely located tuned control circuit having a relatively high ratio of reactance to resistance and having a decay time at least in the order of the decay time of said quenching voltage; a switch associated with said control circuit for selectively bringing said control circuit into and out of resonance with said input circuit, said control circuit being adapted, when in resonance with said input circuit, to receive oscillatory energy from said input circuit during each oscillatory period of said tube and to transmit oscillatory energy to said input circuit during each period when said oscillations are quenched for advancing the start of the next oscillatory period; and an actuating device operable as a function of the flow of output current through said tube.

11. Apparatus of the character described, including: an amplifier tube having cathode, grid and at least two anode elements; a tuned input circuit connected to the grid of said tube, said circuit having resistive, inductive and capacitive components so proportioned that at resonance the ratio of the reactance to the resistance is low and said circuit has a relatively short oscillatory decay time; an output circuit connected to an anode of said tube; coupling between said circuits for causing said tube to oscillate at the resonant frequency of said input circuit; circuit connections for applying a gradually decaying voltage to said tube to quench said oscillations periodically, said voltage preventing said tube from oscillating for a period at least in the order of twice said oscillatory decay time; a remotely located tuned control circuit having a relatively high ratio of reactance to resistance and having a decay time at least in the order of the decay time of said quenching voltage; a switch associated with said control circuit for selectively bringing said control circuit into and out of resonance with said input circuit, said control circuit being adapted, when in resonance with said input circuit, to receive oscillatory energy from said input circuit during each oscillatory period of said tube and to transmit oscillatory energy to said input circuit during each period when said oscillations are quenched for advancing the start of the next oscillatory period; and a current actuated device connected to another anode of said tube, the construction and arrangement being such that the current is insufficient to actuate said device when said control circuit is out of resonance with said input circuit, but said current is sufficient to actuate said device when said control circuit is in resonance with said input circuit.

LEONARD A. MAYBERRY.

REFERENCES CITED

The following references are of record in the file of this patent:

UNITED STATES PATENTS

| Number | Name | Date |
|---|---|---|
| 1,726,806 | Chapin | Sept. 3, 1929 |
| 1,838,084 | Drake | Dec. 29, 1931 |
| 1,944,988 | Lum | Jan. 30, 1934 |
| 2,228,163 | Cohen | Jan. 7, 1941 |
| 2,234,184 | MacLaren | Mar. 11, 1941 |
| 2,343,987 | Lindsay | Mar. 14, 1944 |
| 2,419,569 | Labin | Apr. 29, 1947 |
| 2,419,570 | Labin | Apr. 29, 1947 |